INVENTORS
Leroy L.S Rasch.
Chales A. Woodcock.
Sherman E. Womack.

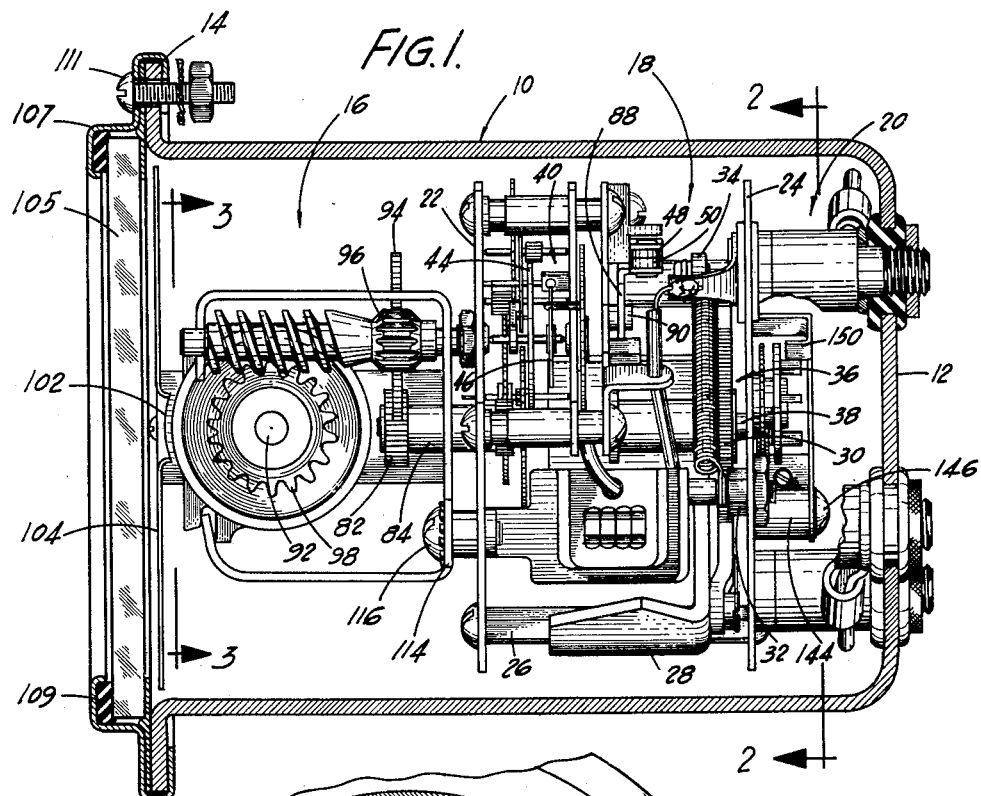

BY A. G. Douvas
Attorney.

Jan. 1, 1963   L. L. S RASCH ET AL   3,071,208
TIMER

Filed April 21, 1960   3 Sheets-Sheet 3

INVENTORS
LEROY L.S Rasch.
Charles A. Woodcock.
Sherman E. Womack.

BY *A. G. Douras*
Attorney

United States Patent Office 3,071,208
Patented Jan. 1, 1963

3,071,208
TIMER
Leroy L S Rasch, Charles A. Woodcock, and Sherman E. Womack, Springfield, Ill., assignors to Stewart-Warner Corporation, Chicago, Ill., a corporation of Virginia
Filed Apr. 21, 1960, Ser. No. 23,703
9 Claims. (Cl. 184—7)

The present invention relates to an improved electrical timer for timing vehicle operation and more particularly to such a timer employed for operation of an automatic centralized lubrication system associated with such vehicles.

In the operation of vehicles, it is important that proper lubrication of the moving elements of the vehicle occur at predetermined intervals to insure continued operation of the vehicles with minimum wear. In the past, the vehicles have normally been periodically lubricated at the option of the operator, with the frequency of lubrication varying considerably. In order to prevent operation of the vehicle under conditions of inadequate lubrication, suitable timers have been employed to periodically initiate operation of automatic means for lubricating the various parts of the vehicle. However, in the past, such timers, which may be either mechanical or electrical, have been relatively costly and, in most cases, extremely complex.

In addition, since the lubrication requirements change considerably with the various types of vehicle, there is usually provided means for adjusting the length of the lubrication cycle as well as the time between each succeeding cycle.

Along with the advent of the automatic centralized lubrication system, various means have been incorporated for indicating the operational time of the vehicles or the engines associated therewith in order to determine the extent of wear on the various parts of the vehicle engine and other elements. These devices generally take the form of a clock mechanism which may include a counter for totalizing the hours of operation of the vehicle engine. These hour meters may be of the mechanical or electrical type and the operation of the clock mechanism is usually initiated by closing of the ignition switch or means associated therewith.

It is therefore the principal object of this invention to provide a combined hour meter and timer for an automatic, centralized lubrication system which is relatively compact, and greatly reduced in cost.

It is a further object of this invention to provide an electrical timer for an automatic centralized lubrication system including switch means which do not appreciably load the timer.

It is a further object of this invention to provide a combined electrical hour meter and timer for an automatic, centralized lubrication system in which the timer is more easily adjustable for setting both the length of the lubrication cycle and for adjusting the time between succeeding lubrication cycles.

Other objects of this invention will be pointed out in the following detailed description and claims and illustrated in the accompanying drawings which disclose, by way of example, the principle of this invention and the best mode which has been contemplated of applying that principle.

In the drawings:

FIGURE 1 is a side elevational view, partially in section of the apparatus forming one embodiment of the present invention.

FIGURE 2 is a rear elevational view, of a section of the apparatus shown in FIGURE 1 taken along lines 2—2 of FIGURE 1.

Figure 4:
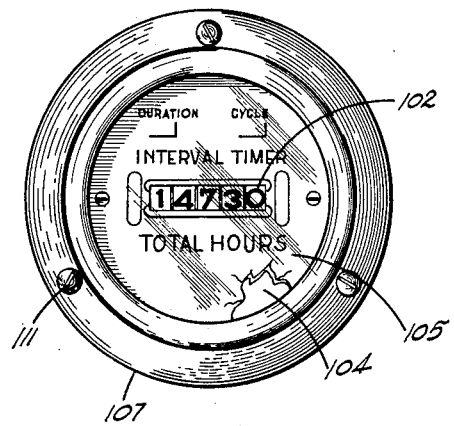
FIGURE 4 is a front elevational view of the apparatus shown in FIGURE 1.

In general, the apparatus of the present invention comprises an electrical solenoid operated clock mechanism section, a counter mechanism section, and a switching section. The clock mechanism section includes an electrical solenoid having a rotatable armature which, upon energization of the solenoid spring loads a pawl and ratchet assembly. The spring acts through the pawls to urge the ratchet to rotate until the spring returns the armature to its start position. The movement of the ratchet is controlled by an escapement drive mechanism connected to the counter section of the mechanism, the counter section acting to totalize the operational time of the vehicle. The switching section of the structure is provided with a rotating disc driven by the escapement mechanism. A plurality of pins radially distributed on the flattened surface of the disc engage a pivotable actuating arm or follower with the arm movable in response to engagement with the pins for actuating a microswitch, closing the circuit to a suitable lubrication control device. Adjustment of the contact means on the actuator arm varies the closure time of the contacts of the microswitch for varying the time duration of a lubrication cycle. The interval between lubrication cycles may be varied by varying the number of pins positioned on the rotating disc.

Referring to the drawings, the improved timer and hour meter includes a cup-shaped metal housing 10 having a rear wall 12 and an outwardly directed flange portion 14 forming an open forward end. The metal housing is adapted to receive the apparatus of the present invention which may be roughly divided into three sections with a first section 16 consisting of the counter mechanism positioned in the forward or frontal end of the casing, an intermediate or clock mechanism section 18 positioned between the counter mechanism section 16 and a switching section 20 formed at the rear of the casing adjacent the rear wall 12. The clock mechanism section 18 is of the type shown in United States Patent No. 2,260,525 issued October 28, 1941 to John W. Hobbs and United States Patent No. 2,294,031 issued August 25, 1940 to John W. Hobbs and John A Miner. While the discussion of the elements and operation making up this portion of the device is somewhat limited, reference may be had to the above patents which disclose in detail the structure and operation of the clock mechanism.

The three sections of the timer are essentially divided by a pair of spaced mounting plates 22 and 24, these plates being supported in spaced-apart relation by suitable distance pieces 26 arranged to maintain the plates in rigid assembled relation. Between the plates 22 and 24 is positioned the portion of the apparatus making up the clock mechanism 18. Briefly, the clock mechanism comprises a solenoid or actuating coil 54, FIGURE 8, which when energized functions to attract a rotatable armature 28, causing rotation of the armature in a clockwise direction. Movement of the armature in this direction acts to tension biasing spring 30. One end of the biasing spring 30 is rigidly connected at 32 to the stationary plate 24 while the other end of the biasing spring 30 is connected to the upper end of rotatable armature 28 at 34. Energization of the solenoid and subsequent pivotable movement of the armature 28 in a clockwise direction spring loads a pawl and ratchet assembly 36. The tensioning of the bias spring 30 acts to urge the ratchet 66 to rotate in a counter clockwise direction as viewed from the left end of casing 10 until the biasing spring 30 returns the armature 28 to its initial start position. The operation of this portion of the device may be more fully comprehended by reference to the above-mentioned U.S. patents. The drive shaft 38, on which is mounted the ratchet assembly 36 is connected to an escapement drive mechanism 40 consisting of a gear train of conventional construction whose output is also connected to the counter drive shaft 42 to cause continued rotation of that shaft during operation of the vehicle. The speed of rotation of the gear train may be controlled by conventional means including the use of a fly wheel 44 and its adjustable spring 46.

Figure 5:
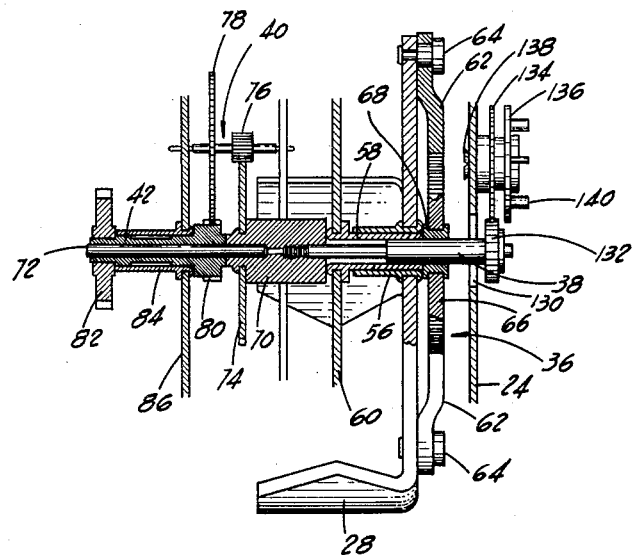
FIGURE 5 is a side elevational view of a portion of the appaartus shown in FIGURE 1 showing the details of the switch mechanism.

The construction of the clock mechanism portion of the device is such that as soon as the armature 28 returns to its start position in response to movement of the escapement mechanism 40, a pair of electrical contacts are closed to again energize the solenoid and spring bias the ratchet wheel. Again, reference to the United States patents above may be had for the operational details relating to the intermittent energization of the solenoid and biasing of the tension spring 30. Basically, an electrical circuit is completed between the source of current such as a battery 52 indicated in FIGURE 8 and the clock solenoid coil 54 through stationary contact 48 and movable contact 50. FIGURE 5 shows the interaction between the clock mechanism 18 which initiates the action, the counter mechanism, section 16, and the switching mechanism, section 20. Upon energization of the solenoid 54, rotation of the armature 28 in a clockwise manner occurs with respect to shaft 38. The armature 28 is mounted on and connected rigidly to a cylindrical member 56. This member is adapted to rotate freely on a second cylindrical member 58 which is rigidly connected to a thin supporting member or plate 60 which extends transversely of housing 10 and is rigidly connected to plate member 22. The cylindrical member 58 allows the shaft 38 to rotate freely therein which in effect provides direct coupling between shaft 38 and the counter drive shaft 42. A pair of pawl members 62 are mounted for pivotable movement on the armature 28 by means of rivet members 64 with the outer end of the pawls 62 acting to engage the teeth of ratchet member 66. Ratchet member 66 is rigidly mounted on shaft 38 by use of an intermediate coupling member 68. As mentioned previously, a conventional gear train 40 forming an escapement mechanism is positioned to the left of armature 28 within the clock mechanism section 18 and is adapted to drive the counter drive shaft 42 at a speed dependent upon the characteristics of the individual gears making up the gear train 40. It can be seen that the drive shaft 38, which is rigidly connected to intermediate member 70 and extension shaft 72, transmits rotation by means of gears 74, 76, 78 and 80 to a pinion gear 82 connected directly to the counter drive mechanism. A cylindrical member 84 is rigidly coupled to frame member 86 and acts to support counter drive shaft 42 in a manner similar to the supporting means 58 for drive shaft 38.

After energization of the solenoid 54 and rotation of the armature 28, the pawls 62 by virtue of their engagement with the teeth on ratchet wheel 66, act to carry the ratchet wheel with them as the driving mechanism is moved under the force of the main driving spring. The driving operation is controlled by the escapement mechanism 40 in the usual manner and as the tension spring 30 compresses, the contacts 48 and 50 which are moved apart by energization of the solenoid and movement of the armature again contact each other to re-energize solenoid 54 momentarily. In this respect, the movable contact member 50 is mounted for rotation on arm 88, FIGURE 1, about pivot point 90. In the manner of the patents noted above, the contacts are quickly movable between an open and closed position by the use of a toggle mechanism. With the rotation of armature 28 limited to a relatively small arc, energization and de-energization of the solenoid, occurs periodically. In the embodiment shown, it takes about three minutes to complete the unwind cycle of the ratchet wheel and armature. Of course, this time may be varied considerably by the use of suitable adjustment means incorporated in the escapement drive mechanism 40.

Figure 3:
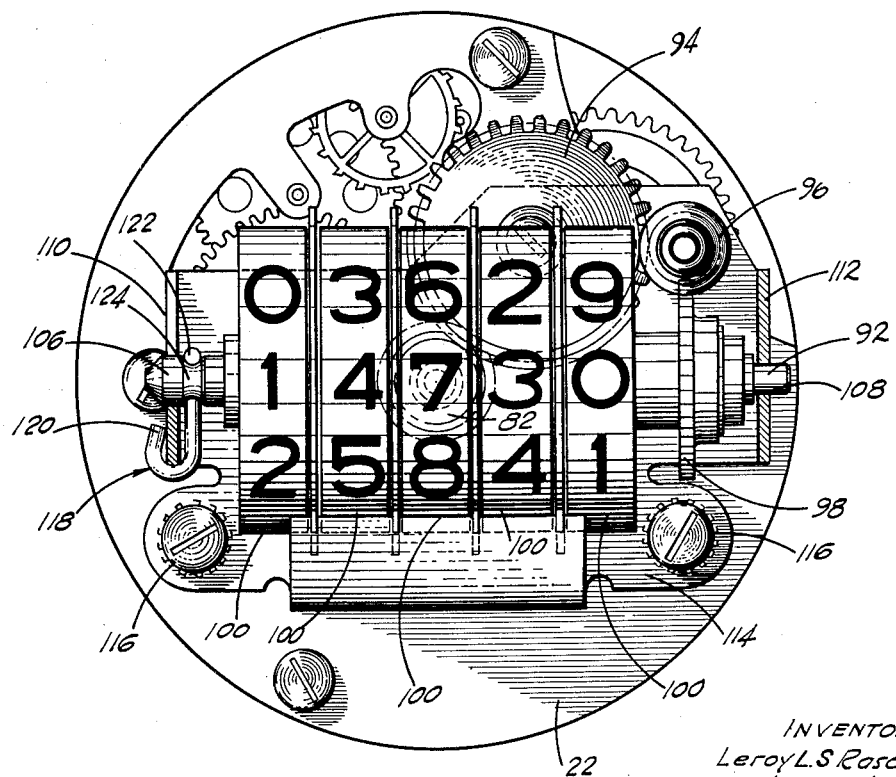
FIGURE 3 is a front elevational view of the structure shown in FIGURE 1 taken along lines 3—3 showing the counter section.

Referring now to the counter section 16, FIGURES 1 and 3, the clock mechanism section 18 acts to drive the pinion gear 82 continuously during operation of the vehicle. Rotation of pinion gear 82 results in a desired rotation of the laterally extending shaft 92 through the use of intermediate gear members 94, 96 and 98 with the rotation of shaft 92 acting to sequentially position in a stepped manner, a plurality of axially aligned discs 100 which are disposed behind the opening 102 of the dial or face plate 104, FIGURE 3. The counter construction is conventional with the laterally extending drive shaft 92 being mounted within a suitable slot 106 and an aperture 108 formed within a pair of forwardly directed flanges 110 and 112, respectively, of a mounting plate 114. The mounting plate is rigidly coupled to the plate member 22 by conventional mounting bolts 116. A spring clip 118 has a portion 120 which engages flange 110 and a portion 122 adapted to rest within groove 124 formed on the shaft 92 adjacent the flange member 110 acting to hold the counter drive shaft 92 and its associated disc members 100 in an operative position with respect to the gear train. Five discs 100 are provided, with each of the discs containing numerals from 0 to 9 which will be visible when brought into view within opening 102 during the operation of the device. For instance, the four discs proceeding from the left hand side may be arranged to indicate to a total of 9,999 hours of operation with the disc at the extreme right side indicating the tenths of an hour. However, it is not necessary that the counter take the form shown and a conventional pointer arrangement may be utilized making use of a face or dial plate containing radial designations of time intervals with a pointer being rotatable about an axis in line with the axis of the face plate 104. A glass or other transparent cover 105 may be attached to the front of casing 10 by means of annular frame member 107 with the whole assembly including suitable seal means 109 being held in place by means of nut and bolt members 111.

The present invention further includes a switch mechanism section 20. The switch is driven by the same clock mechanism, section 18 as is used to drive the counter section 16. The switch is of such construction that there is minimum load on the clock mechanism and the counter drive means. In devices of this nature, employing solenoid actuated timer clock means, the clock generally is of the type having extremely low power output. Conventional switch means place such an abnormally large load on the drive means that the accuracy of the instrument is greatly impaired and in many cases there is insufficient power to operate the switch or switches necessary to actuate the automatic centralized lubrication system.

Figure 6:
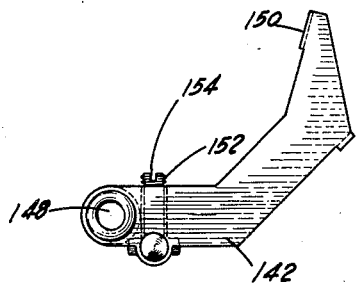
FIGURE 6 is a side elevational view of the switch actuator arm forming a portion of the apparatus of FIGURE 5.
Figure 7:
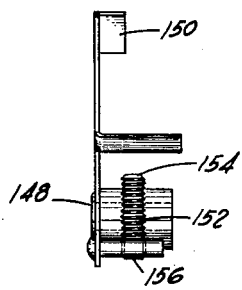
FIGURE 7 is a front elevational view of the switch actuator arm shown in FIGURE 6.

The present invention incorporates an extremely low load switch means which allows operation of a timer clock plus rotation of the counter means completely unhampered by the power requirements necessary to operate the lubrication cycle initiation switch. In this regard, FIGURES 2, 5, 6 and 7 best show the details of the improved switch mechanism. Referring to FIGURE 5, the drive shaft 38 which is driven by ratchet 66 protrudes through a suitable aperture 130 formed in supporting plate 24 and has rigidly connected thereto a gear 132 adapted to drive a disc member 136 which is mounted for rotation on wall member 24 about axis 138. A number of semi-cylindrical dowel members or pins 140 extend from the outer surface of the disc member, away from the plate 24, with the pin members being mounted for easy removal from slots of the same configuration formed at some radial distance from the axis 138, thus, for example, allowing use of either 1, 2, 3, or 4 of the pins, depending upon the operational cycle desired. An actuator arm 142, FIGURES 6 and 7, which is of generally L-shaped configuration is pivotably mounted on supporting plate 24 by use of screw post 144 and screw 146, the screw 146 passing through aperture 148 located on one end of the L-shaped arm or actuator member. The rounded portions of pins 140 essentially act as camming surfaces and are adapted to engage the actuator 140 along cam follower surface 150 which is formed integrally of the member 142 and depends therefrom. The cam follower surface 150 when contacted by a moving pin member 140 causes the lever arm or actuator 142 to pivot in a clockwise direction when viewed in FIGURE 2. Mounted on the actuator arm 142 adjacent pivot point 148 is a screw member 152 which is adjustable laterally by means of notch 154 formed in the end of the screw opposite its contact surface portion 156. A microswitch 158 is rigidly mounted on plate 124 by means of screws 160 such that the actuator pin 162 extends laterally therefrom in contact with the head 156 of screw member 152. Clockwise rotation of actuator arm 142 about pivot point 148 results in closing of microswitch 158 by direct physical contact of screwhead 156 with actuator pin 162, the bias of the microswitch tending to return the actuator arm 142 to its original position and opening the switch after the pin 140 passes contact surface 150 of arm 142.

In a typical mechanism, the intervals between lubrication cycles may be 15 minutes if four pins are used, 30 minutes if two pins are used and one hour if only one pin is used. With the microswitch 158, in FIGURE 8, acting to close the electrical circuit between a source of voltage 52 and the lubrication control and dispensing device 187 after ignition switch 164 is closed, it can be appreciated that the intervals may be increased or decreased by adding or subtracting pins 140 on the disc member 136. At the same time, the duration of a lubrication cycle is dependent upon the closure time of the contacts of the microswitch 158. This may be adjusted from 30 seconds to approximately 5 minutes by rotation of the adjusting screw 152. While it is indicated that for a typical lubrication cycle the initiation of each lubrication cycle will be 15 minutes apart if four pins are used, the actual timing may be varied by adjusting the rate of rotation of the escapement mechanism 40 by the adjustment of spring 46 which will in turn control the speed of rotation of shaft 38 and directly affect both the operation of counter section 16 and the operation of switch section 20.

Figure 8:
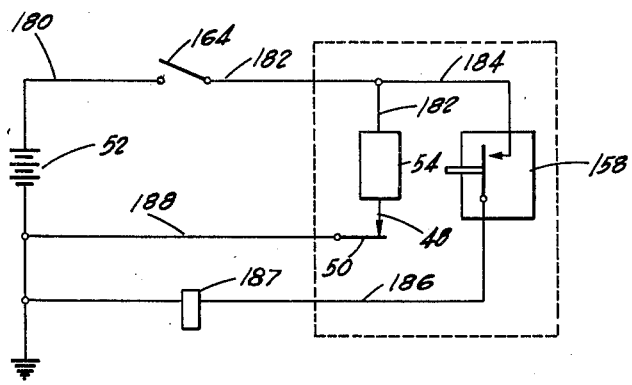
FIGURE 8 is a schematic view of the electrical circuit employed for operating the combined electrical timer and hour meter of the present invention.

Since it is only necessary to lubricate the vehicle during operation of the vehicle, and since it is also desirous to energize the counter only during vehicle operation, the present electrically operated timer is advantageously coupled to a circuit including the ignition switch. Referring to FIGURE 8, ignition switch 164 is coupled to one side of a source of voltage such as battery 52 by means of lead 180 with lead 182 connecting the other side of ignition switch 164 to the clock mechanism solenoid 54. A second electrical lead 184 extends from the ignition switch 164, with this lead 184 being connected to one side of microswitch 158. A return lead 186 passes from the opposite side of microswitch 158 to a lubrication control and dispensing device 187 and thence to ground or to the opposite side of battery 52 or other suitable source of current. In like manner, a suitable return lead 188 extends from moving contact 50 and returns to battery 52 to complete the electrical circuit to the clock mechanism solenoid 54. It is apparent that upon closing of ignition switch 164, the solenoid coil 54 will be intermittently energized on the momentary closing of contacts 48 and 50 as the tension spring 30 compresses during movement of ratchet mechanism 36. It is apparent that when the clock mechanism and more directly the solenoid 54 is turned off by opening of the ignition switch 164, the circuit for the microswitch 158 is also opened. In a typical automtic, centralized lubrication system, the control and dispensing device 187 might include an electrically operated air valve which, upon energization, initiates the operation of the air operated pump. A pump in such a typical system acts to build the lubrication line pressure to a predetermined value at which time a measuring valve attached to the line will discharge predetermined quantities of lubricant to bearing surfaces which are to be lubricated. However, this portion of the system forms no part of the present invention. The length of time during which the contacts of the microswitch 158 are closed may be adjusted to insure complete pressurization of the line, and discharge of sufficient lubricant prior to opening of the microswitch.

The clock escapement drive mechanism 40 is of course mechanical and once it is wound by the energization of the solenoid and clockwise rotation of the armature, it will continue to function until completely unwound even though the ignition switch 164 is opened and the source of current 52 is cut off from solenoid 54 and microswitch 158. Since the microswitch circuit is also de-energized, it is apparent that regardless of the mechanical operation of the escapement mechanism, no lubrication of the vehicle will occur. In most instances, a complete lubrication cycle will have been completed prior to opening of ignition contacts 164 or a lubrication cycle will be initiated as soon as the ignition is closed. This is a desirable feature since a great deal of wear on a vehicle occurs during the initial starting of the vehicle. Most lubrication systems operate with a length of cycle on the order of three to five minutes with the interval between cycles being reasonably short such that initial lubrication upon the starting of the vehicle is almost completely assured.

It is apparent therefore, that the present invention provides a compact, dependable, unified apparatus for indicating the operational time of a vehicle while at the same time initiating periodic, automatic, centralized lubrication of the moving parts of a vehicle in which the switch means associated with the timer does not hamper operation of the timer and it operates without undue load upon the timer mechanism.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. An automatic electrically operated system for periodically lubricating a machine comprising; an electric power source available for energizing said system only when said machine is in operation, a drive mechanism energized by said power source, a clock mechanism continuously actuated by said drive mechanism during operation of said machine, a switch periodically closed in response to said drive mechanism, and electrically operated lubrication means adapted to lubricate said machine responsive to the closing of said switch.

2. A device for automatically actuating a means for lubricating a machine at selectively determined time intervals comprising; switch means for actuating the lubricating means, a time controlled drive mechanism operable upon actuation of said machine, a visible indicator operable by said control drive mechanism for showing the time the machine has been in operation, a cam carrier driven by the time controlled drive mechanism, a plurality of selectively insertable cam means on said carrier, a cam follower adapted to be contacted by said selectively insertable cam means upon actuation of the time control drive mechanism, said cam follower cooperating with said switch means to cause periodic lubrication so that by selectively adding or removing the insertable cam means the interval between successive lubricating operations caused by the switch means may be varied.

3. A device as defined in claim 2 further comprising, cooperative screw means positioned between said cam follower and said switch means, said screw means being adjustable to vary the length of time said switch is operated by said cam.

4. A mechanism for periodically actuating an automatic lubricator for a vehicle, comprising; normally open switch means connected to said vehicle lubricator, said switch means adapted to actuate said lubricator when closed, a timer adapted to be actuated upon operation of the vehicle only, a drive mechanism rotatably driven by said timer, a visible time interval meter for viewing the total time of operation, said visible time indicator being operatvely connected to said drive mechanism drive, a cam follower actuator for said switch, said cam follower switch actuator being pivotally mounted adjacent said switch, a plurality of selectively insertable cams carried by said drive mechanism driven by said timer, said selectively insertable cams adapted to cooperate with said cam follower upon rotation of said timer driven drive mechanism so that by selectively removing desired cams the interval between actuation of said switch may be varied at will, and an adjustable switch actuating surface on the cam follower so that the length of time the normally open switch will be closed by engagement of the cam follower with the cam may also be adjusted.

5. A combination clock-type hour meter and timer switch for indicating operational time of a machine and initiating periodic centralized lubrication of said machine comprising; a rotatable drive shaft, spring biasing means tending to rotate said shaft upon tensioning of said spring, means for periodically tensioning said spring, escapement drive means acting to regulate rotation of said drive shaft, a visible indicator, means connecting said indicator to said drive shaft whereby said indicator indicates operational time of said machine, said means for tensioning said spring being operable only during periods of machine operation, electrical means for initiating periodic lubrication of said machine, normally open electrical switch means operable to actuate said lubricating system, and means associated with said drive shaft for periodically closing said electrical switch means.

6. Apparatus as claimed in claim 2 further including means associated with said escapement means for adjusting the rotational speed of said drive shaft.

7. A combination clock-type hour meter and timer switch for periodically lubricating a machine during operation thereof, comprising; a rotatable drive shaft, a ratchet wheel rigidly coupled to said drive shaft, pawl means associated with said ratchet wheel acting to rotate said ratchet wheel in one direction, spring biasing means acting to cause said ratchet wheel to rotate with respect to said pawl means upon tensioning of said spring biasing means, electrical means operable upon actuation of said machine only for periodically tensioning said spring, and escapement means connected to said drive shaft for regulating the speed of rotation of said drive shaft, a visible indicator for indicating the operational time of said machine, means connecting said rotary drive shaft to said indicator, normally open switch means for periodically initiating lubrication of said vehicle, and switch closing means driven by said rotary drive shaft for closing said switch means to periodically initiate lubrication of said machine during operation thereof.

8. A combination clock-type hour meter and timer switch for periodically energizing centralized automatic lubrication means for a machine during operation thereof, comprising; a driving mechanism having an actuating spring, electrically operable means for intermittently stressing said spring, a circuit for energizing said electrically operable means, a switch in said circuit arranged to be open by operation of said means when substantially fully stressed condition of said spring is reached, means for closing said switch upon compression of said actuating spring whereby said driving mechanism is continuously operated during operation of said machine, visible indicating means for indicating operational time of said machine, means connecting said driving mechanism to said visible indicating means, normally open switch means for energizing said automatic centralized lubrication system, periodically operable means for closing said switch, and means connecting said driving mechanism to said periodically operable means whereby periodic lubrication of said machine is achieved.

9. An improved electrically operated timer for periodically connecting a source of voltage to electrically operated automatic centralized lubrication means for a machine comprising; a driving mechanism having an actuating spring, electrically operable means for intermittently stressing said spring, a circuit connected to said means, a switch in said circuit arranged to be opened by the operation of said means when substantially fully stressed condition of the spring is reached and closed when said spring is compressed to continuously drive said driving mechanism during operation of said machine, a rotary drive shaft connected to said driving mechanism, cam means associated with said drive shaft and adapted to be rotated therewith, a cam follower pivotally mounted adjacent said cam means whereby said cam follower is oscillated periodically by said cam means, a microswitch positioned adjacent said cam follower, a contact surface formed on said cam follower, said contact surface closing said microswitch upon oscillation of said cam follower and means responsive to closure of said microswitch for connecting said source of voltage to said electrically operated lubrication means.

References Cited in the file of this patent

UNITED STATES PATENTS

| | | |
|---|---|---|
| 2,038,287 | Hawks et al. | Apr. 21, 1936 |
| 2,163,864 | Bissell | June 27, 1939 |
| 2,260,525 | Hobbs | Oct. 28, 1941 |
| 2,581,314 | Walker | Jan. 1, 1952 |
| 2,633,798 | Sloan | Apr. 7, 1953 |
| 2,690,526 | Morrison | Sept. 28, 1954 |
| 2,938,970 | Constantine | May 31, 1960 |